(12) United States Patent
Graf et al.

(10) Patent No.: US 6,920,383 B2
(45) Date of Patent: Jul. 19, 2005

(54) METHOD FOR CONTROLLING A DRIVE TRAIN ON A MOTOR VEHICLE

(75) Inventors: Friedrich Graf, Sinzing (DE); Martin Lankes, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/736,371

(22) Filed: Dec. 15, 2003

(65) Prior Publication Data

US 2004/0143384 A1 Jul. 22, 2004

Related U.S. Application Data

(63) Continuation of application No. PCT/DE02/01852, filed on May 22, 2002.

(30) Foreign Application Priority Data

Jun. 28, 2001 (DE) .......................................... 101 13 209

(51) Int. Cl.$^7$ ............................. B60K 4/02; F16H 3/08
(52) U.S. Cl. ............................... 701/51; 477/5; 477/77; 180/65.2; 123/350
(58) Field of Search ............................. 701/93, 95, 51, 701/54, 84; 477/5, 77, 156, 37, 71, 48, 65, 169, 176, 175, 166, 19, 99, 197, 23, 195, 110; 123/350, 396, 336, 399; 180/65.2, 247; 192/219.1, 219.4, 102; 318/611, 630; 475/204, 199, 216, 208

(56) References Cited

U.S. PATENT DOCUMENTS

| | | | | | |
|---|---|---|---|---|---|
| 5,742,917 | A | * | 4/1998 | Matsuno | 701/69 |
| 5,991,682 | A | * | 11/1999 | Ishizu | 701/84 |
| 6,070,685 | A | * | 6/2000 | Takasaki et al. | 180/250 |
| 6,240,356 | B1 | | 5/2001 | Lapke | 701/93 |
| 6,533,701 | B2 | * | 3/2003 | Maruyama | 477/5 |
| 2002/0006849 | A1 | * | 1/2002 | Miyamoto | 477/79 |
| 2002/0032098 | A1 | * | 3/2002 | Ohtsuka | 477/94 |
| 2002/0040612 | A1 | * | 4/2002 | Miyamoto | 74/336 R |
| 2003/0105573 | A1 | * | 6/2003 | Ishizu et al. | 701/93 |

FOREIGN PATENT DOCUMENTS

| | | | | |
|---|---|---|---|---|
| DE | 33 34724 A1 | 4/1985 | | B60K/41/02 |
| DE | 196 11 502 A1 | 9/1997 | | B60K/31/00 |
| DE | 197 21 034 A1 | 11/1997 | | B60K/41/02 |
| DE | 197 51 225 A1 | 5/1998 | | F16D/48/06 |
| DE | 198 41 917 A1 | 12/1999 | | B60K/41/02 |
| EP | 1 078 805 A1 | 8/1999 | | B60K/41/28 |

* cited by examiner

*Primary Examiner*—Richard M. Camby
*Assistant Examiner*—Tuan C To
(74) *Attorney, Agent, or Firm*—Baker Botts L.L.P.

(57) ABSTRACT

On recognition of a slow driving condition within which a creeping function is activated, a set wheel torque is derived by a wheel torque interpretation (56), such that firstly a target speed is achieved and subsequently the vehicle is maintained within a speed range about the target speed.

17 Claims, 5 Drawing Sheets

METHOD FOR CONTROLLING A DRIVE TRAIN ON A MOTOR VEHICLE

CROSS REFERENCE TO RELATED APPLICATION

This application is a continuation of copending International Application No. PCT/DE02/01852 filed May 22, 2002 which designates the United States, and claims priority to German application DE101 31 209.1 filed Jun. 28, 2001.

TECHNICAL FIELD OF THE INVENTION

The invention relates to a method for controlling the drive train on a motor vehicle.

BACKGROUND OF THE INVENTION

If neither the accelerator pedal nor the brake pedal is being operated by the driver of the motor vehicle, when the engine is running and a gear engaged—this gear must be appropriate for starting—, then in a large number of motor vehicles, through appropriate control of the drive train, a function is implemented which causes the motor vehicle to move slowly. In technical jargon, this function is also known by the name of "creeping". This type of creeping function—hereinafter also referred to as creep mode—makes it easier to shunt or start on an incline.

Automatic transmissions generally have a hydrodynamic converter which, when the accelerator and brake pedals are not being operated, causes the motor vehicle to start rolling and to move at a moderate speed. In this case, the engine torque is increased by the converter when the engine is idling, which also produces increased tractive force on starting. Thus, from the vehicle viewpoint, when neither the accelerator pedal nor the brake pedal is being operated, a predetermined load-dependent wheel torque is made available in correlation with adjustment of the internal combustion engine's idling speed.

Hydrodynamic converters are, however, dissipative, and indeed increasingly so the greater the conversion. However, since operating in conversion mode results in higher fuel consumption, it is in many systems severely restricted with a view to optimizing efficiency—usually by using a bridging clutch—or completely different solutions are resorted to for the creeping or starting function.

From the published document EP 1 078 805 A1 a drive train controller is known which has a detection circuit, by means of which detection circuit the respective driving situations of the motor vehicle and the driver's characteristics are determined. A control unit for the clutch is adaptively adjusted when the motor vehicle is started to the driving situation and/or driver's characteristics determined. When the motor vehicle is started, signals with which the engine speed is controlled according to stored characteristics are transmitted by the control unit to the engine controller. A separate characteristic curve is also provided here for a creep mode.

Known drive train controllers for automating a creeping function are based upon selectively increasing the clutch torque when a starting gear is engaged in the transmission. Such creeping functions are referred to below as clutch-torque-based creeping functions. They relate to vehicles with an automated shift transmission and automated clutch. Both dry-running and wet-running variants are suitable for use as a clutch here. A disadvantage in such an implementation of the creeping function, however, is that the clutch torque represents the driver's wishes only indirectly. Since the complete drive train is located between the clutch system and the wheel drive of a motor vehicle, a change in the clutch torque can, depending on the operating conditions of the individual components of the drive train, bring about different changes in the wheel torque. This is, for example, the case if different gears are engaged in the transmission. When creeping, if the starting gear with the highest ratio (first gear) is selected, for example, then the resulting wheel torque is, given the same clutch torque, greater than in the gear with the second-highest ratio (second gear).

Where a creeping function is based on a clutch torque, consideration must therefore be given to the entire drive train when adjusting the clutch torque. Consequently, as the complexity of the drive train increases, the complexity of determining the clutch torque to be set also increases. However, a trend toward more and more complex drive systems can already be seen, e.g. through use of an additional drive unit in the form of a crankshaft starter generator alongside the conventional internal combustion engine.

SUMMARY OF THE INVENTION

The object of the invention is therefore to establish a method for controlling the drive train of a motor vehicle, by means of which method a creeping function can comfortably be controlled independently of the configuration of the drive train, independently of the transmission design and independently of the type of drive unit.

This object can be achieved by a method for controlling the drive train of a motor vehicle having an engine and a transmission, the method comprising the steps of:

recognizing a slow driving condition if the engine is running and a starting gear is engaged in the transmission and the vehicle speed lies below a specified threshold value and the accelerator pedal and the brake pedal are not being operated, specifying a nominal wheel torque on recognition of a slow driving condition by a wheel torque interpretation such that firstly a target speed is achieved and subsequently the vehicle is maintained within a specified speed range about the target speed.

The method may further comprise the steps of:

increasing the wheel torque in a first phase linearly from an initial value to a target value specified by the wheel torque interpretation, maintaining the wheel torque, after the target value has been achieved, in a second phase at a constant value until the target speed is achieved, decreasing the wheel torque, after the target speed has been achieved, linearly to zero and adjusting the wheel torque in a fourth phase depending on the resistance to rolling such that the vehicle is maintained within a specified speed range about the target speed.

The target value for the wheel torque can be determined by the wheel torque interpretation depending on the driving situation and driver type. The target value specified for the wheel torque by the wheel torque interpretation can be changed by the driver. The target value for the wheel torque can be set to a minimum possible wheel torque if the downhill force or the resistance to rolling in the direction of travel exceeds a specified threshold value. The target value for the wheel torque can be reduced by a push torque arising if the downhill force or the resistance to rolling in the direction of travel lies below a specified threshold value. The creeping function can be discontinued through selective reduction of the wheel torque if the downhill force or the resistance to rolling opposing the direction of travel exceeds a specified threshold value. After the wheel torque has been reduced, an automatic braking intervention can be instigated. The adjustment time for the wheel torque can be shortened if the downhill force or the resistance to rolling opposing the direction of travel lies below a specified threshold value.

According to the invention, a creeping function is to be activated in a slow driving condition of the motor vehicle. Such a slow driving condition is recognized when the engine is running and a starting gear is engaged in the transmission and the vehicle speed is below a specified threshold value and the accelerator pedal and the brake pedal are not being operated. A nominal wheel torque is then specified by a wheel torque interpretation such that firstly a target speed is achieved and subsequently the vehicle is maintained within a specified speed range about the target speed.

Particularly advantageous is the applicability of the method according to the invention independently of the configuration of the drive train. In particular, the method can be used in the case of both drive trains without torque converters and drive trains with torque converters.

BRIEF DESCRIPTION OF THE DRAWINGS

An embodiment of the invention is described with reference to the Figures below, in which.

DETAILED DESCRIPTION OF THE PREFERRED EMBODIMENTS

Figure 1:
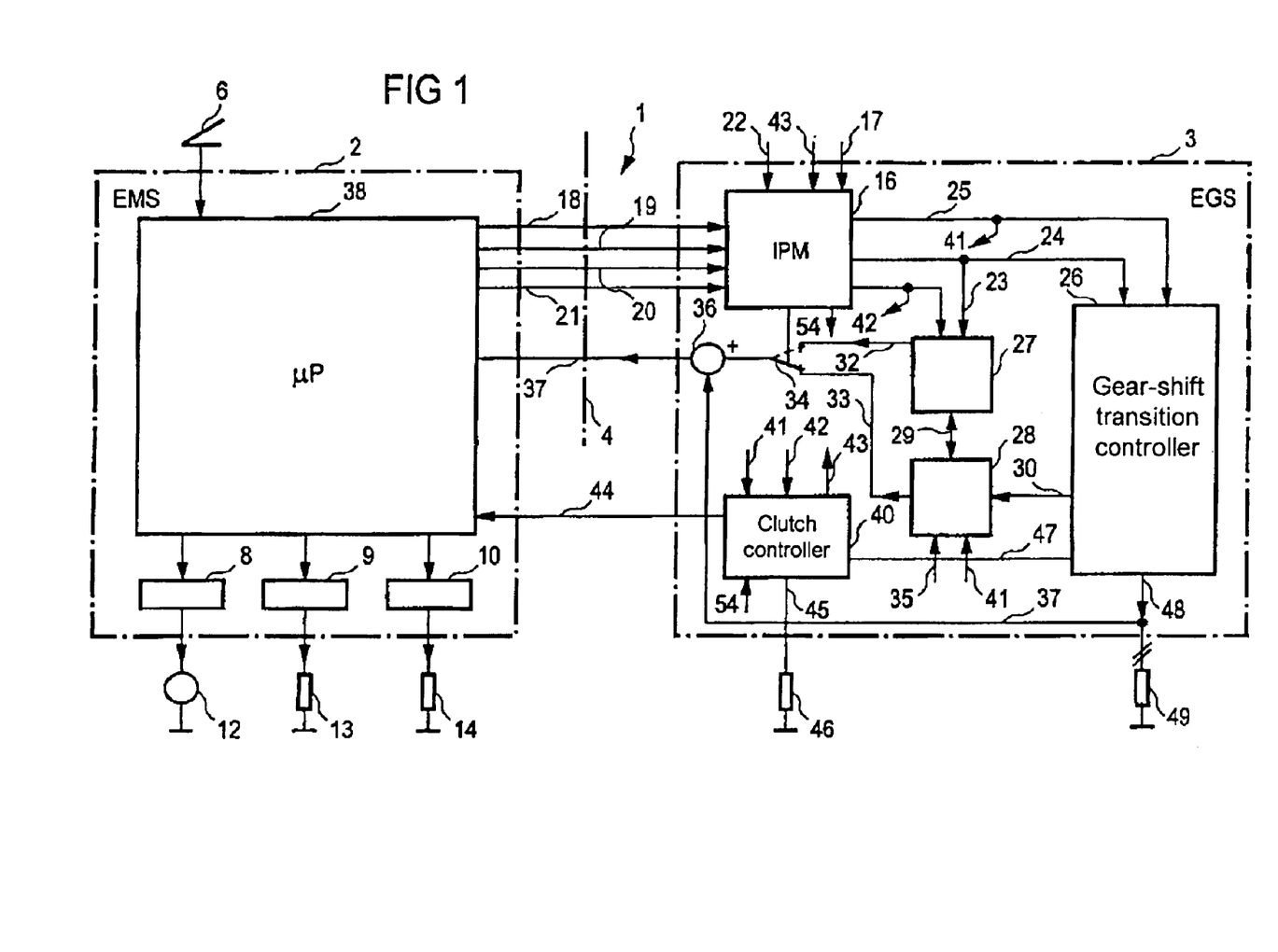
FIG. 1 shows a block diagram of a drive train controller according to the invention.

Referring to FIG. 1, a diagrammatically represented drive train controller 1 of a motor vehicle contains an electronic engine controller (EMS) 2 and an electronic transmission controller (EGS) 3 which communicate with one another via an interface 4, by exchanging with one another data concerning operating variables of the motor vehicle and control signals, in particular in the form of physical describing variables. The engine controller 2 receives signals from an accelerator pedal 6 and has three control-signal outputs: a signal output 8 for the throttle valve, a signal output 9 for the fuel injection and a signal output 10 for controlling the ignition angle of an internal combustion engine, not shown further here, of a motor vehicle. An electric motor 12 actuating the throttle valve of the vehicle is controlled via the signal output 8. Actuators 13 or 14, fashioned, for example, as piezoelectric or inductive actuators which adjust the quantity of fuel to be injected and the ignition angle of the engine, are controlled via the signal outputs 9 and 10.

The transmission controller 3 contains the following components: a switching controller or IPM controller 16 which carries out integrated, i.e. comprehensive control of the drive train (IPM stands for Integrated Powertrain Management) and in particular defines the switching strategy. It receives signals from different sensors, control devices or other vehicle components via lines—to aid comprehension shown here as a line 17. Data relating to different values of the engine torque is fed via lines 18, 19 and 20 from the engine controller 2. Via a line 21, it receives information relating to the engine nominal torque specified by the driver of the motor vehicle or else relating to the position of the accelerator pedal 6.

Via a line 22, the IPM controller 16 receives the respective output speed of the transmission, which corresponds to the wheel speed and thus—in a predefined ratio—the speed of the motor vehicle. Via a branching signal line 23, 24, the IPM controller 16 sends a target gear to be set or a target transmission ratio to a gear-shift transition controller 26 and to a first decision circuit 27 as well as to a second decision circuit 28. These two decision circuits 27 and 28 are connected to one another by a bidirectional line 29.

All the relevant information relating to the driving strategy, the driving style of the driver and the respective driving situation are fed via a line 25 from the IPM controller 16 to the gear-shift transition controller 26. This gear-shift transition controller transmits to the second decision circuit 28 via a line 30 control signals, with which the deviation over time of the engine torque, i.e. the speed with which the engine torque is reduced, is controlled.

In each case one signal output of the first and second decision circuits 27, 28 is connected to terminals of a switch 34 via signal lines 32 and 33, respectively. The switch 34 controlled by the IPM controller 16 connects either the output of the first decision circuit 27 or the output of the second decision circuit 28 to an adder 36 whose output is connected via a line 37 to the engine controller 2, i.e. in particular to a microprocessor 38 of the engine controller. Via the line 37, the transmission controller 3 communicates the requested engine torque to the engine controller 2. Via a line 35 a timing clock is applied to the second decision circuit 28, with which timing clock the control of the transmission controller 3 can be separated from the control of the engine controller 2. A line 39 connects an output of the gear-shift transition controller 26 to an input of the adder 36.

The engine torque requested by the driver applies at an input marked "+" of the adder 36. This driver-requested torque, as it is known, is corrected by the IPM controller 16 outside a circuit, i.e. outside a gear-shifting function. During a gear shift it is corrected by the gear-shift transition controller 26. The switch 34 thus distinguishes between control outside a gear-shifting process and control inside or during a gear-shifting process.

A clutch controller 40 receives all the relevant information relating to the driving strategy, the driving style of the driver and the respective driving situation from the IPM controller 16 via a line 41 which branches off from the line 25, information relating to the requested nominal wheel torque, the target position of the clutch and the transferred engine torque via a line 42, and information relating to the current status of the drive train via a line 54. From the requested nominal wheel torque, the clutch controller 40 can specify a nominal clutch torque. The clutch position can thus be precontrolled and control quality is raised significantly. The clutch controller 40 itself transmits to the IPM controller 16 via a line 43 an output signal which signals to the IPM controller a restriction of the clutch function, for example because of overheating. Excessive heat generation in the clutch can occur for example where a heavily laden vehicle is repeatedly started on an incline. Such overheating is advantageously determined with the aid of a thermal model in the clutch controller 40. The clutch controller 40 transmits the actual clutch position to the engine controller 2 via an output line 44. If the drive train is equipped with a torque converter as a starting element, then the clutch controller 40 can be omitted.

The line 41 is also connected to the second decision circuit 28, such that all the relevant information relating to the driving strategy, the driver's driving style and the respective driving situation is also fed to this decision circuit. The profile of the (signal) lines 41 and 42 is only indicated in the drawing for the sake of greater clarity.

The clutch controller 40 is connected by a control line 45 to a clutch actuator 46 which controls a clutch (not shown here) of the drive train 1. The control of the clutch is coordinated with the gear-shifting operation via a line 47 which connects the gear-shifting transition controller 26 to the clutch controller 40.

The gear-shift transition controller 26 is connected by means of multiple control lines 48, which are shown here as a multiple line, to electromechanical or electrohydraulic transmission actuators 49 which carry out the gear change in a transmission, also not shown here.

Figure 2:
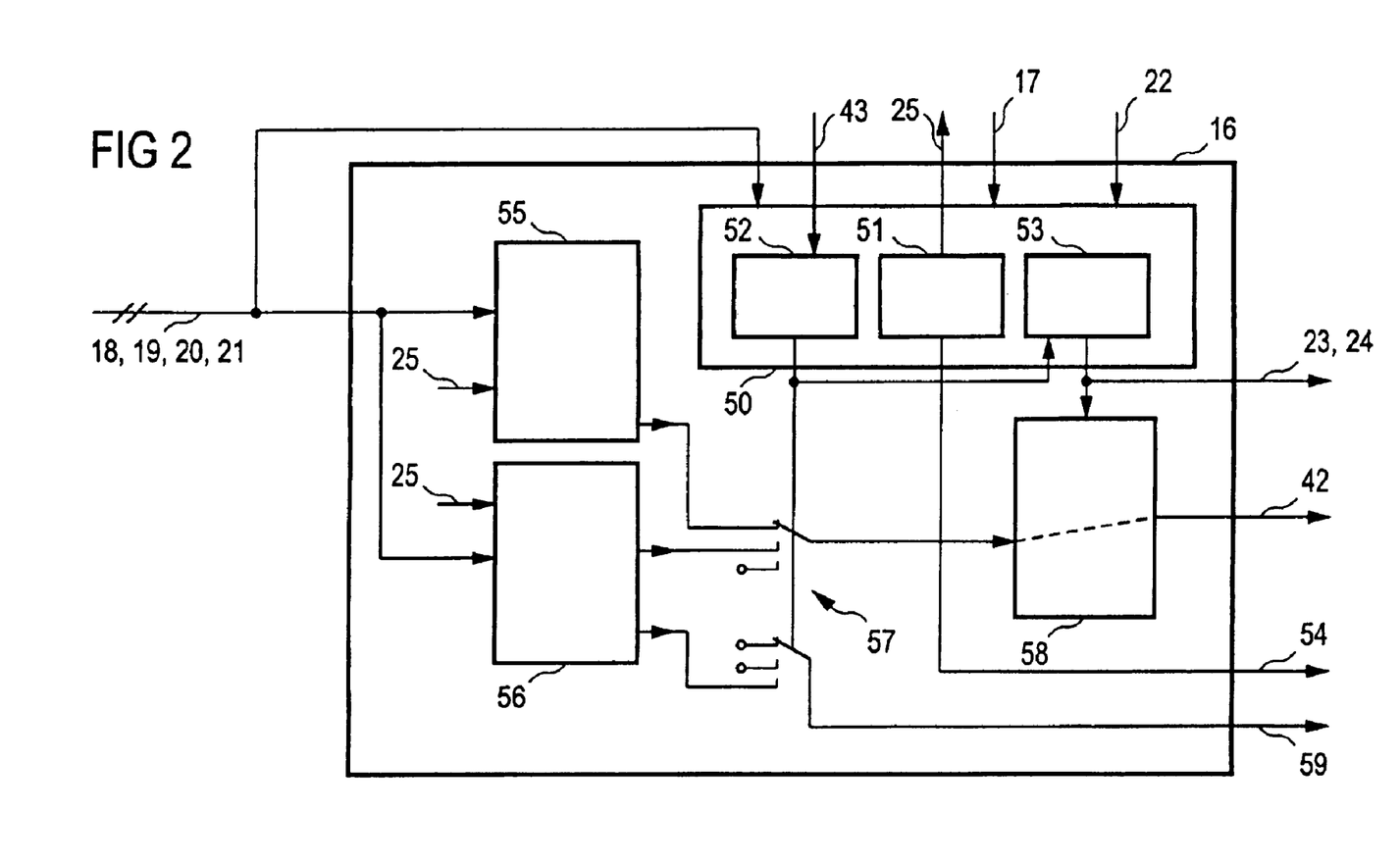
FIG. 2 shows a block diagram of a drive train management as a component of a drive train controller according to FIG. 1.

Referring to FIG. 2. the transmission controller 3 is furnished with further circuit components which in the present embodiment are all integral parts of the IPM controller 16. The IPM controller 16 is a central and vital part of the controller of the drive train and it coordinates the operation of all its individual components. It is therefore also referred to as a metacontroller. The IPM controller 16 is shown here as being contained in the transmission controller, but this is not necessary. It can also be accommodated elsewhere, for example in the engine controller 2, or else be implemented as a self-contained control unit.

Data from the engine controller 2 is fed to a classification block 50 via the lines 18 to 21 and the respective output speed of the transmission is fed via the line 22 (FIG. 2). In addition, signals are fed from various sensors, control devices or other vehicle components via lines—shown here to aid comprehension as a line 17. The following parameters, for example, are included here:

operation of the brake pedal operation of the accelerator pedal vehicle speed direction of movement seat occupancy engine hood open engine running gear engaged or transmission ratio All available signals which are appropriate for characterizing the current or future driving situation should, as a matter of principle, be fed to the classification block 50. These include in particular also data from vehicle-external information sources, such as GPS or UMTS signals and/or digital card information, as are known in respect of the operation of navigation systems. Likewise, all available signals which are appropriate for characterizing the driving style of the driver should also be fed to the classification block 50.

In detail, the classification block 50 has the following functional blocks: a situation detector 51, a driving condition detector 52 and a driving strategy selector 53.

The situation detector 51 serves to evaluate the input signals of the classification block and to generate output signals which characterize as precisely as possible the current driving situation, the driving style of the driver and the driving strategy—output on line 25—and the current status of the drive train—output on line 54. Here the output signal on line 25 comprises for example information relating to the driver type, the incline of the road surface or the current vehicle loading. The output signal on line 54 by contrast contains information relating to the current actual and/or nominal status of the whole drive train, for example "start-stop operation" or "cruise operation". Possible states of the drive train are described in detail in the earlier application DE 100 479 06.5. From this status information the target position of the clutch 52, for example, can then be determined.

The driving condition detector 52 serves in particular to detect a slow driving condition or creeping condition in which the creeping function or creep mode should be activated. The driving condition detector 52 will be explained in detail during the course of the description below.

The driving strategy selector 53 contains gear-shift characteristics which serve to adapt the transmission gear or the transmission ratio as optimally as possible to the respective driving situation and to the respective driving condition—to this end the output signal of the driving condition detector 52 is also fed to the driving strategy selector 53. A target gear or a target transmission ratio is then output on line 23/24. If the drive train is equipped with a torque converter and a converter bridging clutch, then the controller of the bridging clutch is advantageously integrated in the driving strategy selector 53. The nominal status of the converter bridging clutch is then also output on line 23/24.

Figure 3:
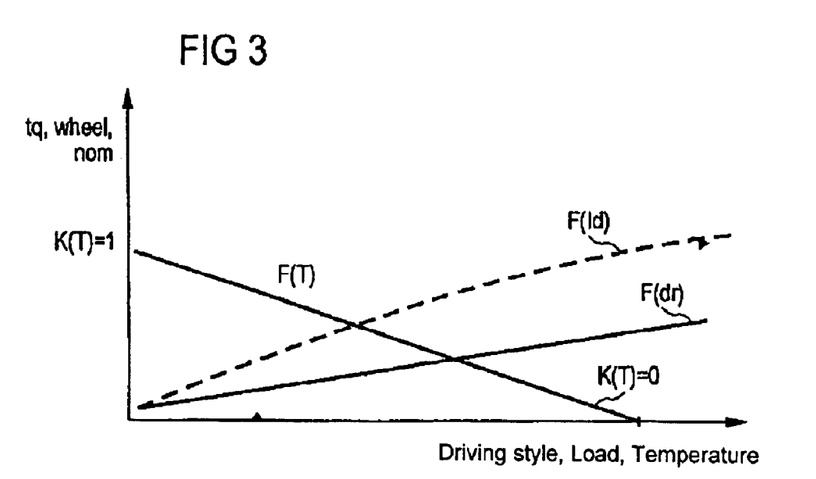
FIG. 3 shows a characteristics map for wheel torque interpretation.

Depending on the driving condition, a nominal wheel torque is specified by one of two different circuit blocks. In the normal driving condition, operation of the accelerator pedal or brake pedal by the driver is converted in a first wheel torque interpretation 55 into a nominal or required wheel torque. In the slow driving condition by contrast, neither the accelerator pedal nor the brake pedal is operated, so that in order to implement the creeping function a suitable target value for the nominal wheel torque—also referred to below as the creep torque—must be specified by the system. This specification of the wheel torque is provided by a second wheel torque interpretation 56. To this end, in the second wheel torque interpretation 56 both the signals transmitted by the engine controller via the lines 18 to 21 and the signals on line 25 characterizing the driving situation and the driving style are evaluated. In order to generate optimum target values with regard to driving comfort and safety for the nominal wheel torque, a large number of parameters must be taken into account within the wheel torque interpretation 56. Solely by way of example, four criteria which affect the target value for the wheel torque will be mentioned here:

With increasing incline of the road surface, the target value for the wheel torque is raised When a sporty driving style is detected, a higher target value is specified for the wheel torque In order to achieve a greater tractive force on starting, as occurs when a torque converter is used, the target value for the wheel torque is raised with increasing starting resistance When a parking maneuver is detected, for example via signals from a parking aid, the target value for the wheel torque is reduced Depending on the scope and accuracy of the signals made available, the target value for the wheel torque can be adapted as optimally as possible to the respective driving situation and the driving style of the driver. The second wheel torque interpretation 56 is advantageously fashioned as a fuzzy system, since such a system is especially well suited for such tasks. A possible fuzzy-logic rule set which would be processed here by the fuzzy system, could for example be:

IF driver IS sporty THEN $tq_{wheel,nom}$ IS very_high
IF driver IS med THEN $tq_{wheel,nom}$ IS med
IF load IS med THEN $tq_{wheel,nom}$ IS med
IF load IS high THEN $tq_{wheel,nom}$ IS high
IF temp,clutch IS high THEN $tq_{wheel,nom}$ IS small The second wheel torque interpretation 56 can, however, also be fashioned in the form of a characteristics map. Referring to FIG. 3. such a characteristics map is shown. In the characteristics map, two characteristic curves are filed for the nominal wheel torque $tq_{wheel,nom}$. Characteristic curve F(dr) shows the nominal wheel torque depending on the driving style, and characteristic curve F(ld) the nominal wheel torque depending on the resistance to rolling of the motor vehicle. This resistance to rolling is frequently a sum of the incline of the road surface and the vehicle mass. If both pieces of information are available separately, for example through calculations as described in the earlier application DE 10101758.8, or through inclusion of incline information from a navigation system, then the characteristic curve F(ld) can be resolved into two separate characteristic curves. Here, an interpolation can be made between the two characteristic curves with one criterion (mm/max) or linearly (characteristics map). Another characteristic curve F(T), shown in FIG. 3, can provide a reduced creep mode if, for example, the clutch is subjected to high thermal loading- signaled by a signal on line 43. The function value K(T) here represents a factor which reduces the original creep torque from F(ld, dr).

Referring back to FIG. 2, by means of a switching block 57, it is possible to switch between the specified wheel torques from the first wheel torque interpretation 55—for the normal driving condition—and the second wheel torque interpretation 56—for the slow driving condition. The switching block 57 is controlled by the previously mentioned driving condition detector 52. By evaluating the previously described input signals of the classification block 50, an entry/exit into/from the slow driving condition is detected by the driving condition detector 52. The following entry conditions apply here:

drive motor is running and
starting gear is engaged and
vehicle speed lies below a specified threshold value, the so-called "standstill threshold value" and
accelerator pedal is not being operated and
brake operation is released
Possible exit conditions may be:
Operation of the brake pedal and/or
Operation of the accelerator pedal and/or
Resistance to rolling exceeds a specified threshold value and/or
Excessive loading of the torque transmission system, in particular excessive heat generation in the clutch—such changes in system behavior are also advantageously reported acoustically or optically to the driver—and/or detection of a sensor failure, for example accelerator pedal or brake pedal sensors and/or exceeding of a specified time span.

Referring to FIG. 2, in order to ensure optimum adaptation of the transmission ratio to the particular driving situation and driving condition, the driving strategy selector 53 contains advantageously its own set of gear-shift curves for creep mode. In this way, a low gear can be selected when creeping forward on an incline so as to achieve the lowest possible differential speed in the clutch and thereby place only a minimal thermal loading on the clutch.

The output signal of the wheel torque interpretations 55 and 56 selected via the switching block is advantageously fed to a distributor unit 58 which distributes the required wheel torque to different drive units, where applicable. To this end, the required wheel torque is converted into nominal driving torques for the individual drive units. If electrical machines are also available, for example in the form of a crankshaft starter generator, a signal is also fed to the distributor unit 58, said signal characterizing the charge of the associated energy store, since the charge of the energy store is of fundamental significance to the usability of the electrical machine. Likewise, the distributor unit 58 can, if the motor vehicle is equipped accordingly, act upon an electrical brake in order to bring the motor vehicle to a safe system state in the event of it rolling downhill when creep mode is not enabled. In the Figure, it has been assumed for reasons of clarity that only an internal combustion engine is available as a drive unit. The output signal of the distributor unit 58 on line 42 consequently corresponds to the input signal of the distributor unit 58. If, however, the drive train is furnished for example with an integrated starter generator and a torque converter, then the driving torque is preferably applied by the starter generator, since this starter generator delivers a high torque at low speed. The internal combustion engine can be switched off at this time, which reduces emissions and consumption. In order to calculate the necessary torque of the starter generator, the converter gain must be taken into account. In an alternative configuration of a drive train, an electrical machine can be provided directly on the transmission output. This electrical machine would then be controlled by a signal on line 42.

Figure 4:
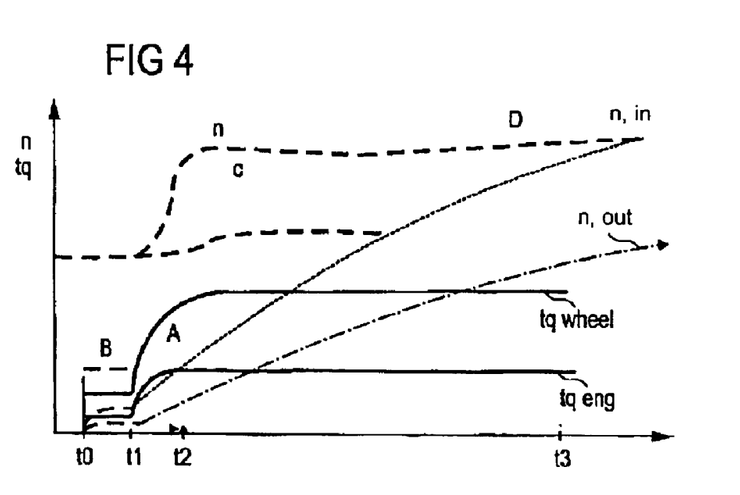
FIG. 4 shows a time-dependent characteristic curve of engine speeds and engine torques of the drive train controller according to FIG. 1 in the case of a creeping function.

Referring to FIG. 4, FIG. 4 shows the course over time of the following variables in a slow driving condition and in a subsequent starting operation: the engine speed n, the transmission input speed $n_{\_ein}$, the transmission output speed $n_{\_aus}$, the engine torque $tq_{\_eng}$ and the wheel torque tq_wheel. Up to time t0, the idle speed control of the engine controller 2 (FIG. 1) determines the engine speed tq_eng. This system behavior arises for example in the case of a braking operation. At time t0 the brake is released, for example, so that all the conditions for entering the slow driving condition are fulfilled. As of this time, a target value is specified for the wheel torque tq_wheel by the second pedal interpretation 56 shown in FIG. 2. Referring to FIG. 3, in the case of travel on a level road, a nominal wheel torque is specified according to the characteristic curve F(dr) and where there is a rising road surface a nominal wheel torque is specified according to the characteristic curve F(ld). Control of the engine speed is assumed by the IPM controller 16 by means of the clutch controller 40 (See FIG. 1). In this way, a conflict between EMS-based and IPM-based speed control is avoided. The nominal value for the engine speed should however not deviate markedly from the default specified by the engine controller 2 (FIG. 1), so as to ensure optimum system behavior with regard to pollutant emissions and fuel consumption. Referring to FIG. 1, the optimum idling speed is therefore transmitted via one of the lines 18 to 20 from the engine controller to the 11 IPM controller 16 and to the clutch controller 40. The switching of the structure is carried out by means of a signal to the engine controller 2 via the line 44. The clutch controller 40 controls the engine speed here according to stored characteristic curves, for example by means of specific characteristic curves for operation in winter or for operation in which the clutch is subjected to high thermal loading. The clutch controller 40 is thus parameterized according to the vehicle specifications by the IPM controller 16. This IPM controller has characteristic curves for the engine speed in the form of a function ne =f(tq_eng_nom;t), where ne is the engine speed, $tq_{eng}$_nom is the required engine torque and t is the time.

Referring to FIGS. 1 and 2, if the engine torque resulting from the wheel torque specified by the second pedal interpretation 56 lies above a value which is the maximum possible at optimum idling speed, then the clutch controller 40 can effect an appropriate engine intervention. This maximum possible engine torque is also transmitted by the engine controller via one of the lines 18 to 20.

As of time t1, the starting operation procedure begins. A detailed description of a starting operation and of the ensuing curves of the speeds and torques can be seen in EP 1 078 805 A1, which was mentioned in the introduction.

In conventional drive train controls, the wheel torque is a variable produced from the engine torque and the transmission ratio, and it is not used there as a reference variable for controlling the drive train. Also, conventional drive train controls use only one characteristic curve for the starting operation. The present drive train control 1, in contrast, uses for different creeping and starting situations characteristic curves which are in each case adapted to these situations.

Furthermore, depending on the operating mode of the internal combustion engine (layer charge/homogeneous), different curves can be integrated into the operation of the engine so as to achieve favorable operating conditions for the engine in terms of combustion stability.

Figure 5:
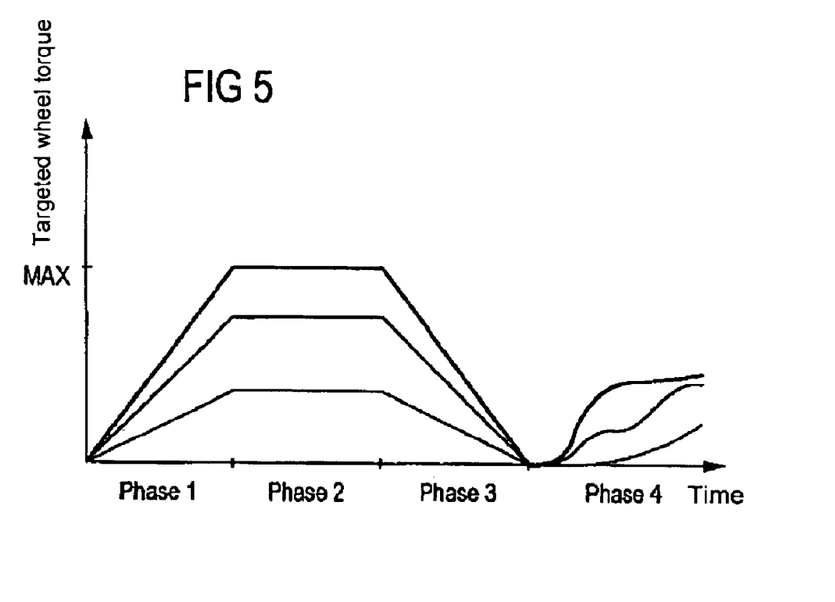
FIG. 5 shows a time-dependent characteristic curve of the specified wheel torque in a creeping function.
Figure 6:
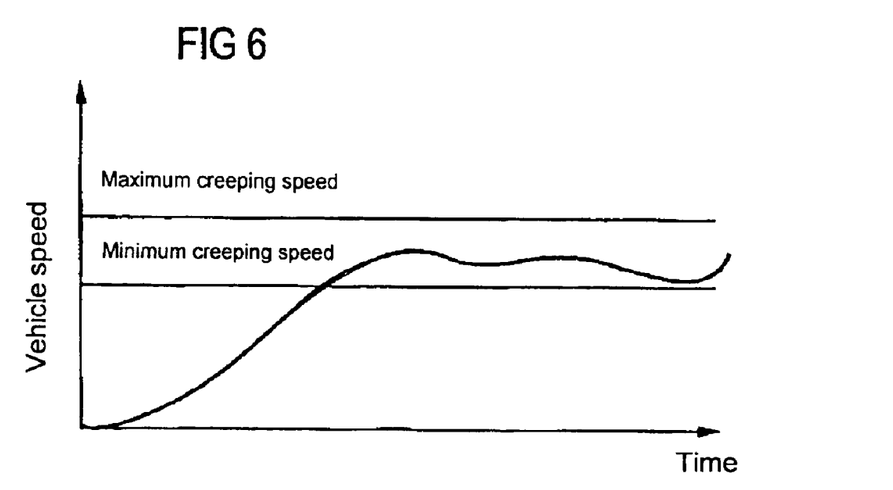
FIG. 6 shows a time-dependent characteristic curve of the vehicle speed in a creeping function.

Referring to FIGS. 5 and 6, a wheel-torque-based creeping function is described below. This function comprises four phases. In a first phase, the wheel torque is increased in a linear ramp up to a value specified by the second wheel torque interpretation 56 (FIG. 5). If this value is achieved, the wheel torque is held constant in a second phase, which however results in a further acceleration of the motor vehicle (FIG. 6). If a specified speed threshold (target creeping speed) is exceeded, the wheel torque is reduced in a linear ramp to zero in a third phase. In a fourth phase, the wheel torque is then adjusted, taking into account the current resistance of the road surface, such that the vehicle speed is maintained within a specified speed range.

Referring to FIG. 5, in a preferred embodiment, the driver of the motor vehicle has the facility for specifying via a control device, for example a rotary knob on the clutch lever or the instrument panel, a nominal wheel torque for the creeping operation. However, here the time interval for the first phase is preferably held constant, irrespective of the presetting of the driver, i.e. if the default values are higher, the adjustment is made correspondingly faster. In this way, the driver also indirectly influences by his setting the dynamics of the creeping operation. Moreover, as the specified value for the wheel torque increases, the speed threshold (target creeping speed) is also increased. As extreme values, wheel torques can be preselected by the driver for the following operating situations:

Vehicle with minimum/maximum load

Forward starting gear with maximum ratio (1st gear) engaged

No incline in the road surface

Constant minimum/maximum acceleration within a specified time span

Referring to FIG. 6, if a creeping operation is to be initiated on an incline, the downhill force and the resulting downhill-driving wheel torque must be taken into account in controlling the creeping torque. To this end, after checking the initial conditions for a creeping operation (step S1), in step S2 the incline of the road surface, the resulting downhill force or the downhill-driving wheel torque acting through the downhill force is determined. If the selected direction of travel and direction of the downhill force agree (step S3) and if the incline, the downhill force or the resulting pushing torque lie above a corresponding specified threshold value (step S4), then the minimum wheel torque possible is targeted (step S5). If the value lies below the threshold value (step S6), then the required nominal wheel torque is reduced by the pushing torque present (step S7).

Figure 7:
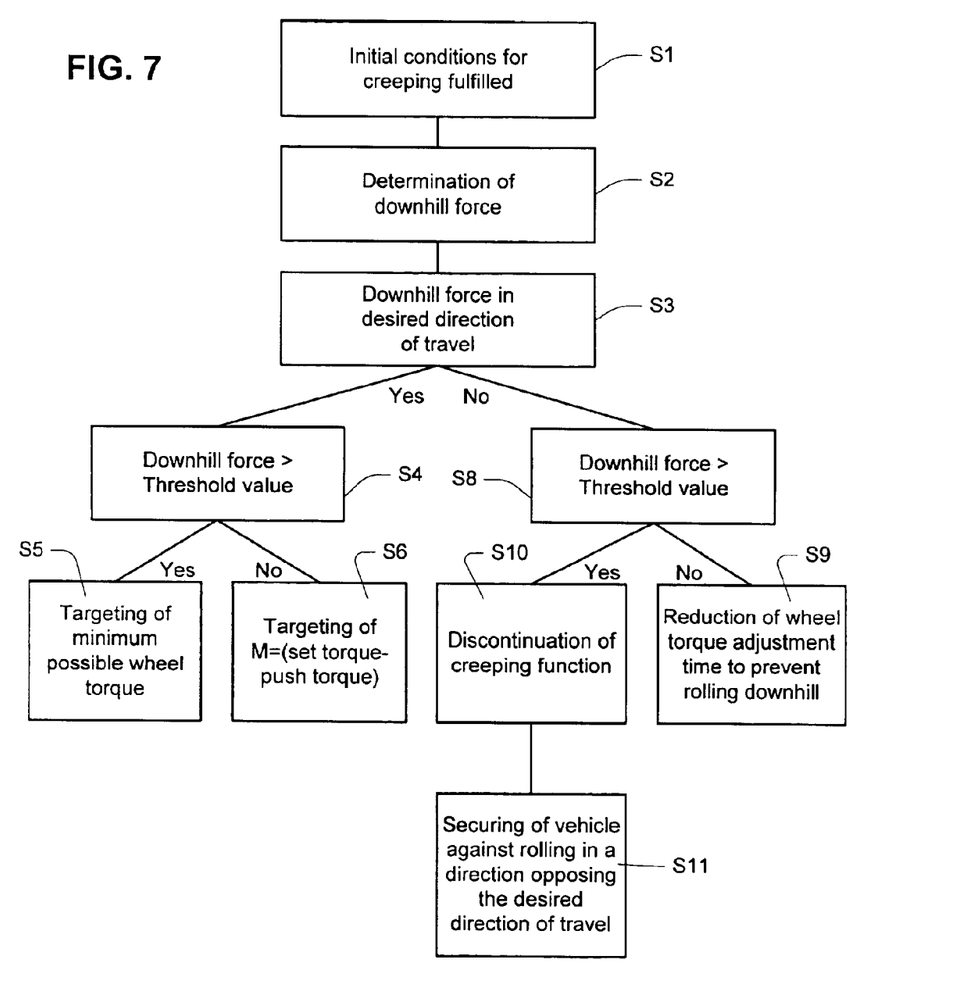
FIG. 7 shows a flowchart of a method according to the invention for controlling a drive train as per FIG. 1.

Referring back to FIG. 7, if, by contrast, the direction of travel and the direction of the downhill force do not agree, then the following applies:

If the incline, the downhill force or the backward-driving wheel torque acting through the downhill force lie below a specified threshold value (step S8), the adjustment time for the wheel torque is shortened such that the wheel torque can be adjusted as rapidly as possible depending on the downhill force so as to stop as rapidly as possible the motor vehicle rolling downhill (step S9). If, however, the value exceeds the threshold value, then in order to prevent the motor vehicle from accidentally rolling downhill, the creeping operation is discontinued by deliberately reducing the wheel torque (step S10) and a braking intervention is automatically instigated (step S11). This function of "preventing rolling back" is explained again in detail below:

Referring to FIG. 2, in addition to specifying a wheel torque in the slow driving condition (creep mode), with the aid of the second wheel-torque interpretation 56, the vehicle can be prevented from rolling backwards when it comes to a standstill on an incline. Here, the wheel torque is firstly reduced according to a specified function which is dependent on the downhill force or the resistance to rolling. A necessary braking torque depending on the incline of the road surface is determined by the second wheel-torque interpretation 56, for example, by calculating the torque of the downhill force or by reading out from a characteristic field. Here too it is particularly advantageous if information relating to incline of the road surface and vehicle mass is available separately. This function can be implemented particularly advantageously if the motor vehicle is fitted with an electric brake, as the required braking torque can then be provided without loss of power and corresponding wear in the clutch. However, the simultaneous application of drive torque and braking torque must definitely be ruled out. For this reason, the switching block 57 (FIG. 2) is fashioned such that a separate switch position for "preventing rolling backward" is provided. The required braking torque is transmitted depending on the incline of the road surface from the second wheel-torque interpretation 56 to an electrical braking system (not shown) via a line 59. The switching block 57 is also instructed to activate the "preventing of rolling backward" by the driving condition detector 52. The following entry conditions are checked by the driving condition detector 52:

engine is running
starting gear is engaged
vehicle speed is virtually zero (standstill)
brake operation is released
acceleration pedal is not being operated
incline in road surface or resistance to rolling is above specified threshold value
direction of force down the slope opposes the selected direction of travel If all these conditions are fulfilled, the switching block 57 is instructed such that the appropriate nominal torque can be transmitted over the line 59.

Analogously, "preventing rolling backward" is deactivated if one of the following conditions is detected as fulfilled by the driving condition detector 52:

Brake pedal is being operated and/or
Accelerator pedal is being operated and/or
Vehicle speed is not equal to zero and/or
Error mode is active, for example in the event of sensor failure.

We claim:

1. A method for controlling the drive train of a motor vehicle having an engine and a transmission, the method comprising the steps of:

recognizing a slow driving condition if the engine is running and a starting gear is engaged in the transmission and the vehicle speed lies below a specified threshold value and the accelerator pedal and the brake pedal are not being operated, specifying a nominal wheel torque on recognition of a slow driving condition by a wheel torque interpretation such that firstly a target speed is achieved and subsequently the vehicle is maintained within a specified speed range about the target speed.

2. The method according to claim 1, further comprising the steps of:

increasing the wheel torque in a first phase linearly from an initial value to a target value specified by the wheel torque interpretation, maintaining the wheel torque, after the target value has been achieved, in a second phase at a constant value until the target speed is achieved, decreasing the wheel torque, after the target speed has been achieved, linearly to zero and adjusting the wheel torque in a fourth phase depending on the resistance to rolling such that the vehicle is maintained within a specified speed range about the target speed.

3. The method according to claim 1, wherein the target value for the wheel torque is determined by the wheel torque interpretation depending on the driving situation and driver type.

4. The method according to claim 1, wherein the target value specified for the wheel torque by the wheel torque interpretation can be changed by the driver.

5. The method according to claim 1, wherein the target value for the wheel torque is set to a minimum possible wheel torque if the downhill force or the resistance to rolling in the direction of travel exceeds a specified threshold value.

6. The method according to claim 1, wherein the target value for the wheel torque is reduced by a push torque arising if the downhill force or the resistance to rolling in the direction of travel lies below a specified threshold value.

7. The method according to claim 1, wherein the creeping function is discontinued through selective reduction of the wheel torque if the downhill force or the resistance to rolling opposing the direction of travel exceeds a specified threshold value.

8. The method according to claim 7, wherein after the wheel torque has been reduced, an automatic braking intervention is instigated.

9. The method according to claim 1, wherein the adjustment time for the wheel torque is shortened if the downhill force or the resistance to rolling opposing the direction of travel lies below a specified threshold value.

10. A method for controlling the drive train of a motor vehicle having an engine and a transmission, the method comprising the steps of:

recognizing a slow driving condition if the engine is running and a starting gear is engaged in the transmission and the vehicle speed lies below a specified threshold value and the accelerator pedal and the brake pedal are not being operated, specifying a nominal wheel torque on recognition of a slow driving condition, increasing the wheel torque in a first phase increased linearly from an initial value to a target value specified by the wheel torque interpretation, maintaining the wheel torque, after the target value has been achieved, in a second phase at a constant value until the target speed is achieved, decreasing the wheel torque, after the target speed has been achieved, linearly to zero and adjusting the wheel torque in a fourth phase depending on the resistance to rolling such that the vehicle is maintained within a specified speed range about the target speed.

11. The method according to claim 10, wherein the target value for the wheel torque is determined by the wheel torque interpretation depending on the driving situation and driver type.

12. The method according to claim 10, wherein the target value specified for the wheel torque by the wheel torque interpretation can be changed by the driver.

13. The method according to claim 10, wherein the target value for the wheel torque is set to a minimum possible wheel torque if the downhill force or the resistance to rolling in the direction of travel exceeds a specified threshold value.

14. The method according to claim 10, wherein the target value for the wheel torque is reduced by a push torque arising if the downhill force or the resistance to rolling in the direction of travel lies below a specified threshold value.

15. The method according to claim 10, wherein the creeping function is discontinued through selective reduction of the wheel torque if the downhill force or the resistance to rolling opposing the direction of travel exceeds a specified threshold value.

16. The method according to claim 15, wherein after the wheel torque has been reduced, an automatic braking intervention is instigated.

17. The method according to claim 10, wherein the adjustment time for the wheel torque is shortened if the downhill force or the resistance to rolling opposing the direction of travel lies below a specified threshold value.

* * * * *